No. 767,583. PATENTED AUG. 16, 1904.
J. B. LONDON.
TIRE.
APPLICATION FILED FEB. 6, 1903.
NO MODEL. 2 SHEETS—SHEET 1.

Witnesses

J. B. London
Inventor by
Attorneys

No. 767,583. Patented August 16, 1904.

UNITED STATES PATENT OFFICE.

JAMES B. LONDON, OF CRESTVIEW, TENNESSEE, ASSIGNOR OF ONE-FOURTH TO JAMES C. BENNETT, OF CRESTVIEW, TENNESSEE.

TIRE.

SPECIFICATION forming part of Letters Patent No. 767,583, dated August 16, 1904.

Application filed February 6, 1903. Serial No. 142,172. (No model.)

*To all whom it may concern:*

Be it known that I, JAMES BAXTER LONDON, a citizen of the United States, residing at Crestview, in the county of Lawrence, State of Tennessee, have invented certain new and useful Improvements in Tires; and I do hereby declare the following to be a full, clear, and exact description of the invention, such as will enable others skilled in the art to which it appertains to make and use the same.

This invention relates to vehicle-tires; and it has for its object to provide a construction of tire which may be easily and firmly secured to a common style of wood rim or felly having grooves formed in its side faces and which construction will be resilient and will not depend for its resiliency upon inflation.

Figure 1:
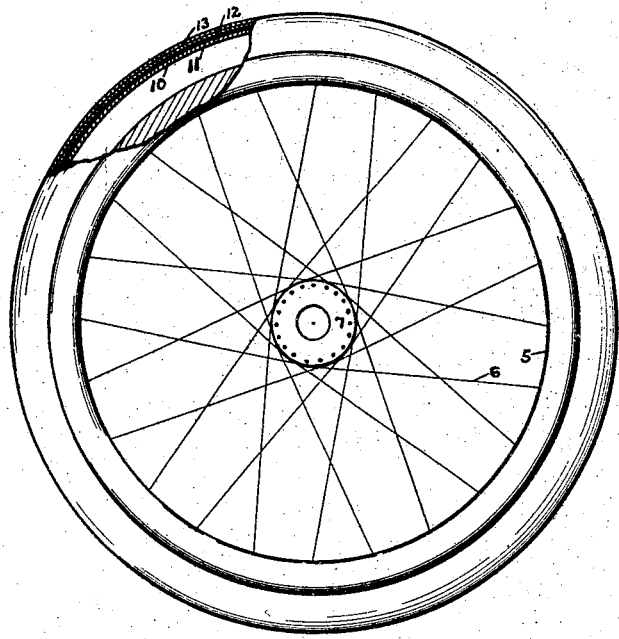
Figure 2:
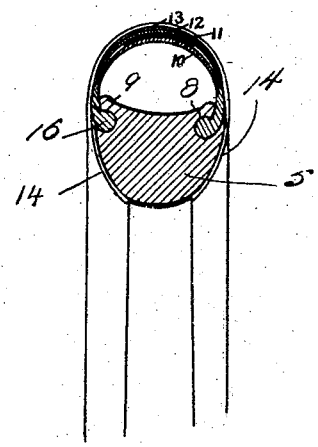
Figure 4:
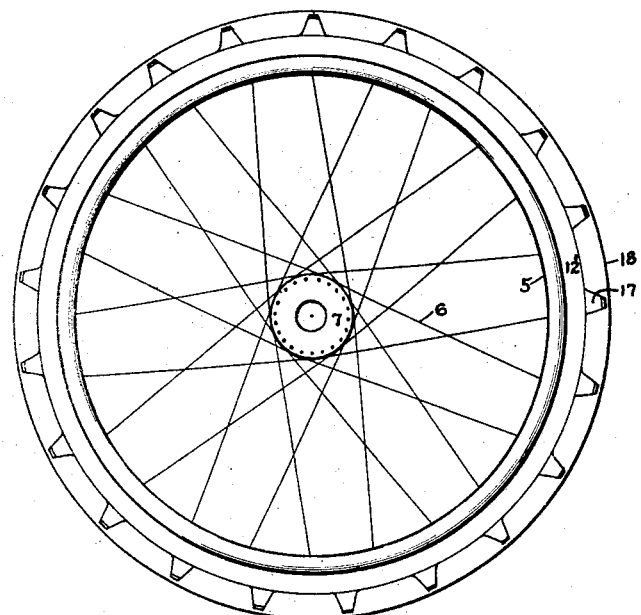
Figure 3:
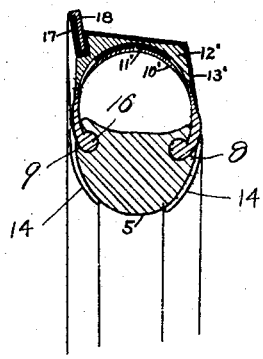
Figure 5:
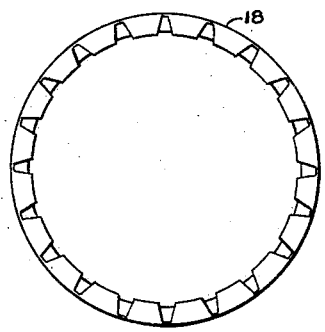

In the drawings forming a portion of this specification, and in which like numerals of reference indicate similar parts in the several views, Figure 1 is a side elevation showing a tire embodying the present invention. Fig. 2 is a transverse section through a portion of the tire. Fig. 3 is a transverse section through a portion of a flange-wheel having a tire embodying the present invention. Fig. 4 is a side elevation of a wheel, such as is illustrated in Fig. 3. Fig. 5 is an elevation of the casing shown in Fig. 4.

Referring now to the drawings, there is shown a wheel including a wooden felly 5, to which are connected the spokes 6, which radiate from a hub 7, the outer periphery of the felly being curved transversely, while the sides of the felly have continuous grooves 8 and 9 formed therein.

The tire comprises a composite portion which extends around the periphery of the felly and attaching portions connected to the side edges thereof. The tread portion of the tire consists of an inner layer 10 of rubber or fabric, upon which is disposed the transversely-arc-shaped metal strip 11, against the outer face of which rests the strip 12 of rubber, there being an outer or tread strip 13, which may be either of rubber or leather. The layers above mentioned are disposed one above the other in the order named, the side edges thereof being joined to the strips 14, which latter are the attaching-strips.

In attaching the tire it is disposed over the periphery of the felly, and the attaching members 14 are passed inwardly over the side faces of the felly and lapped against the inner face of the felly, the tire having ribs or enlargements 16 on the lines of connection or attachment of the members 14 for engagement in the grooves in the side faces of the felly.

It will be understood that the different layers in the tire are cemented together and that the side or attaching members 14 are cemented to the felly, the engagement of the ribs in the grooves serving to relieve the cement of numerous strains to which it would be subjected should the ribs and grooves be omitted.

In the use of the tire the metal strip serves to hold the layers thereon in spaced relation to the wheel-felly, the resiliency of the metal plate insuring easy riding, and the inner rubber layer serves to prevent excessive jolting when the tire is compressed to a degree that would bring the metal strip against the felly if the rubber lining were omitted.

In Fig. 4 of the drawings the invention is shown applied to a flanged or car wheel. In this form of the invention the inner strip 10' is rubber, the second strip 11' is metal, the third strip 12' is rubber, and the outer strip 13' is metal. The rubber 12' in this case is made thicker at one side than at the other to give the proper taper to the wheel, and from the metal strip 13' project hooks 17, which extend downwardly over the side face of the thickened or thicker portion of the rubber member 12' and then extend upwardly and above the strip 13'. In these hooks is received a metallic annulus 18, which forms the flange of the wheel. The flange is notched in its inner periphery and is grooved in its faces, so that the hooks may lie therein flush with the faces of the flange.

In practice other modifications of the invention may be made, and any suitable proportions and materials may be used for the various parts without departing from the spirit of the invention.

What is claimed is—

1. In a vehicle-wheel, the combination with a felly having grooves in its side faces, of a tire comprising a tread portion disposed over the periphery of the felly and including a plurality of layers, and attaching members secured to the side edges of the tread portion and overlapped and secured upon the inner face of the felly, said attaching portions having ribs engaged in the grooves of the felly.

2. A vehicle-tire comprising a tread portion including a transversely-arc-shaped spring-metal layer, a layer of rubber against the inner face of the metallic layer, a layer of rubber against the outer face of the metallic layer, a wear-strip against the outer face of the last-named layer, and attaching members secured to the side edges of the layers of the tread portion and having retaining-ribs at the lines of connection of the tread portion and attaching portions.

3. A vehicle-tire comprising a tread portion having attaching members adapted to be secured to a felly and having hooks at one edge to receive a flange.

4. The combination with a wheel, of a resilient tire disposed thereon, said tire having attaching members cemented to the wheel, hooks at one side of the tire, and a flange with which said hooks are engaged.

In testimony whereof I affix my signature in presence of two witnesses.

JAMES B. LONDON.

Witnesses:
S. L. BARNES,
AGGIE WILLIAMS.